Dec. 20, 1960 L. E. BARTON 2,965,820
HIGH GAIN SEMI-CONDUCTOR DEVICES
Filed Feb. 17, 1950
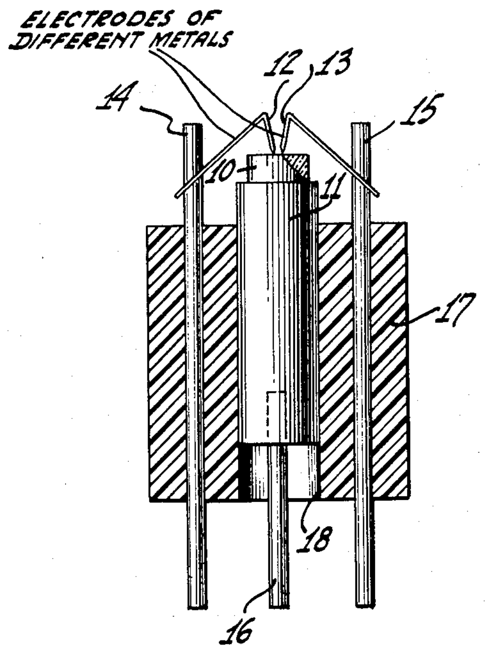
Inventor
LOY E. BARTON
By H. C. Weston
Attorney United States Patent Office 2,965,820

Patented Dec. 20, 1960

2,965,820

HIGH GAIN SEMI-CONDUCTOR DEVICES

Loy E. Barton, Princeton, N.J., assignor to Radio Corporation of America, a corporation of Delaware Filed Feb. 17, 1950, Ser. No. 144,790

4 Claims. (Cl. 317—235)

This invention relates generally to semi-conductor devices which will provide amplifiers, oscillators or the like, and particularly relates to such a device having improved emitter and collector electrodes, thereby to increase the gain of the device.

A semi-conductor device of the type referred to is provided with a semi-conducting body having a base electrode, an emitter electrode and a collector electrode in contact therewith. Such a device will provide an amplifier, oscillator or the like and is usually known as a transistor. A conventional transistor comprises a body of germanium which may be of the N type. Both N and P type germanium are well known. The N type germanium has a limited number of electrons which are free to conduct current. In the P type germanium current conduction appears to take place as if the carriers were positive charges. A transistor having a body of N type germanium is believed to have a surface layer which behaves like P type germanium and with which the emitter and collector electrodes are in contact. Under these conditions a negative bias potential is impressed on the collector electrode with respect to the base electrode while the emitter electrode is biased positively with respect to the base electrode for operation as a transistor.

The emitter electrode takes its name from the fact that it is believed to emit or inject positive charge carriers into the germanium crystal. The collector electrode then collects these positive charge carriers. These charge carriers are called "holes." The base electrode controls the potential of the bulk of the germanium crystal.

A hole is believed to be a defect or virtual positive charge of short lifetime in the crystalline structure of the germanium caused by a current flowing in the emitter. Such a hole will attract an electron which may travel toward the hole under the influence of an external electrical field. Accordingly, the travel of a hole may be considered simply a travel or movement of a hole or virtual positive charge from one point to another in the crystalline structure. It will be evident from the above explanation that whether the crystal is of the P type or of the N type, current conduction takes place by movement of electrons to the emitter and from the collector into the crystal to neutralize the holes in the case of N type crystals and for a P type crystal the electrons simply travel from the emitter through the crystal to the collector.

Consequently, in a transistor consisting of an N type germanium crystal which is believed to have a P type surface layer the negative collector will emit electrons or inject them into the crystal. These electrons are then collected by the positive emitter electrode which accordingly withdraws electrons from the crystal. In accordance with the accepted theory, the material of the electrodes should have no influence on the electrical behavior of the device. This was believed to be due to the barrier layer which is assumed to exist in the neighborhood of the surface and probably between the theoretical P-N boundary of the crystal. However, in accordance with the present invention it has been found that the collector and emitter electrodes should consist of different materials to increase the gain of the resulting device.

It is accordingly the principal object of the present invention, to provide a semi-conducting device of the character described having a body of germanium crystal provided with emitter and collector electrodes which are of such materials as to facilitate the flow of electrons from one electrode into the crystal and to facilitate the withdrawal of the electrons from the crystal into the other electrode.

A further object of the invention is to provide a transistor having a body of N type germanium and provided with emitter and collector electrodes of such metals or metal alloys as to promote the flow of electrons from the collector electrode into the crystal and the collection of the electrons from the crystal by the emitter electrode.

In accordance with the present invention, the emitter and collector electrodes of a transistor consist of different metals or metal alloys. Thus, the electrode which injects electrons into the crystal preferably consists of an alloy containing an element of the phosphorus group including phosphorus, antimony, arsenic and bismuth or lead which in turn is closely related to bismuth. If the transistor has a body of N type germanium with an assumed P type surface layer the collector electrode is the one which injects electrons. Of course, if a transistor has a body of P type germanium with an assumed N type surface layer, the emitter electrode will actually emit the electrons. The other electrode of the transistor which withdraws electrons from the crystal may consist of almost any metal or alloy which does not contain an element of the phosphorus group including lead. Again, in a transistor having N type germanium the emitter functions to withdraw or absorb electrons from the crystal. It preferably should have a sharp point which will withstand high pressure so that the emitter preferably consists of a hard metal or metal alloy.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which the single figure is an elevational view, partly in section, of a semi-conductor device embodying the present invention.

The drawing illustrates by way of example a semi-conductor device including body 10 which preferably consists of germanium of the N type. However, it is to be understood that P type germanium may also be used. Body 10 may be in the form of a flat disc as shown and is soldered or sweated to cylinder 11 which may be made of brass or any metal which is a good conductor of electricity. Cylinder 11 forms the base electrode of the device which is in low-resistance, non-rectifying contact with body 10. The semi-conductor device is further provided with emitter electrode 12 and collector electrode 13 which are shaped as disclosed and claimed in the copending application of George M. Rose, Serial No. 90,702, filed April 13, 1949, now Patent 2,538,593, granted on January 16, 1951, entitled "Semi-Conductor Amplifier Construction," and assigned to the assignee of this application. Emitter and collector electrodes 12 and 13 are in high-resistance, rectifying contact with body 10 and consist of comparatively thin wires of different metals or metal alloys as will be more fully disclosed hereinafter. As clearly shown in the drawing, electrodes 12 and 13 each consist of a pointed wire, the tip of which is in contact with body 10 while their free ends are soldered or otherwise secured to supports 14 and 15 which may, for example consist of stiff copper wires. Cylinder 11 is also provided with a stiff wire 16 which may tightly fit into a suitable opening or recess as illustrated. Metallic supports 14 and 15 are imbedded in cylinder 17 of a suitable insulating material such as Bakelite. Cylinder 11 has a press fit in a central opening 18 of cylinder 17 and may be raised to provide the required contact pressure between crystal 10 and point electrodes 12 and 13 as has been explained in the Rose patent above referred to. Supports 14, 15 and wire 16 may be spaced to fit a sub-miniature tube socket.

Crystal 10 is preferably electrolytically anodized and collector electrode 13 is preferably pulsed by passing one or more electric pulses between collector electrode 13 and base electrode 11 as disclosed and claimed in applicant's copending application Serial No. 118,428, filed September 28, 1949, now U.S. Patent No. 2,686,279, issued August 10, 1954, entitled "Semiconductor Device" and assigned to the assignee of this application.

In accordance with the present invention collector electrode 13 in an N type germanium device consists of a metal or of a metal alloy including an element of the phosphorus group such as phosphorus, antimony, arsenic and bismuth. Furthermore, collector electrode 13 may also consist of lead or include lead which is chemically closely related with bismuth. By way of example, the collector electrode may consist of Phosphor bronze or of a copper alloy including either antimony or arsenic or both. Furthermore, the collector electrode may consist of type metal which comprises lead, tin and antimony. It is believed that a collector electrode of such a metal or metal alloy will promote the flow of electrons into the germanium crystal and through the barrier layer of the germanium. Furthermore, it is believed that elements of the phosphorus group including lead neutralize any holes which may exist near the collector point and which constitute a current for its operation. It is of course, well known that the elements of the phosphorus group have an excess electron as compared with germanium.

In accordance with the present invention, the emitter electrode in an N type germanium device should absorb electrons. To this end the emitter may consist of almost any hard metal which does not contain an element of the phosphorus group because phosphorus would neutralize the holes which the emitter injects into the crystal. By way of example, the emitter may consist of steel, copper, beryllium copper, duralumin, brass, platinum, tantalum, tungsten, or molybdenum. The emitter electrode may even consist of solder. Piano steel wire has been found particularly effective because it produces a particularly sharp and hard point which permits a high contact pressure between the emitter electrode and the crystal.

It is well known that if a small amount of an element of the phosphorus group is added to pure germanium it will act as an N type impurity to give the germanium N type properties. Such N type impurities include phosphorus, antimony, arsenic and bismuth. It is believed that a small amount of the elements of the phosphorus group which are contained in the collector electrode enter the germanium by fusion or diffusion at the point of contact during the above described pulsing. Thus, it is well known that as little as .0005 percent of phosphorus will alter the properties of pure germanium. Accordingly, even if only a very minute amount of a phosphorus group element enters the germanium, significant changes of its electrical properties may be expected. Thus, it has been found that the direct current in the inverse direction is increased after pulsing of the device. This is significant in view of the fact that if N type germanium is doped with increasing amounts of phosphorus, a drop of the back resistance is obtained. It is believed that the above facts may explain the increased gain of a semi-conductor device having a collector electrode which contains an element of the phosphorus group including lead. However, at the present time, no definite theory can be advanced.

It has been found that a semi-conductor device in accordance with the invention having an emitter electrode made of piano steel wire and a collector electrode made of Phosphor bronze wire had the following properties.

| | |
|---|---|
| Emitter voltage | +.3 volts |
| Emitter current | 8 ma. (milliamperes) |
| Emitter resistance | 30 ohms |
| Collector voltage | —10 volts |
| Collector current | 18.4 ma. |
| Collector load resistance | 500 ohms |
| Power gain | 38 db |

Further critical adjustment of the emitter and collector voltages gave a maximum power gain of 43 db without appreciable distortion.

The same device was measured as a class A amplifier with the following results.

| | |
|---|---|
| Emitter voltage | —.3 volts |
| Emitter series resistance | 200 ohms |
| Collector voltage | —22 volts |
| Collector current | 24 ma. |
| Collector resistance | 920 ohms |
| Collector input power | 530 mw. (milliwatts) |
| Collector output power | 144 mw. |
| Collector efficiency | 27.2 percent |

It has been found that the collector electrode should consist of or contain an element of the phosphorus group such as phosphorus, antimony, arsenic, bismuth or lead. The emitter electrode should consist of a different material and should not contain an element of the phosphorus group. By way of example, a hard steel wire has been found to be particularly effective for the emitter electrode.

There has thus been disclosed an improved semi-conductor device having an increased gain by reason of its construction and mode of operation. This is due in part to the fact that the emitter and collector electrodes are of different metals or metal alloys as described and provide improved performance in a transistor device without materially increasing the cost.

What is claimed is:

1. A semi-conductor device suitable as an amplifier, oscillator or the like, said device comprising a body of N type germanium, a base electrode in contact with said body, an emitter electrode and a collector electrode in contact with said body, said collector electrode consisting essentially of a metal and containing at least a portion of one of the elements selected from the group consisting of phosphorus, arsenic, antimony, bismuth and lead, thereby to facilitate the flow of electrons from said collector electrode into said germanium body, said emitter electrode consisting of steel substantially free of any element from said group, thereby to facilitate the flow of electrons from said germanium body into said emitter electrode.

2. A semi-conductor device suitable as an amplifier, oscillator or the like, said device comprising a body of N type germanium, a base electrode in contact with said body, an emitter electrode consisting of a pointed steel wire in contact with said body, and a collector electrode consisting of a pointed wire of Phosphor bronze in contact with said body.

3. A semi-conductor device suitable as an amplifier, oscillator or the like, said device comprising a body of N type germanium, a base electrode in contact with said body, an emitter electrode consisting of a pointed steel wire in contact with said body, and a collector electrode consisting of a pointed wire of a copper-antimony alloy in contact with said body.

4. A semi-conductor device suitable as an amplifier, oscillator or the like, said device comprising a body of N type germanium, a base electrode in contact with said body, an emitter electrode consisting of a pointed steel wire substantially free of any element of the group consisting of phosphorus, arsenic, antimony, bismuth and lead, said emitter electrode wire being in contact with said body, and a collector electrode consisting of a pointed metallic wire containing bismuth in contact with said body.

References Cited in the file of this patent

UNITED STATES PATENTS

| | | |
|---|---|---|
| 2,502,479 | Pearson et al. | Apr. 4, 1950 |
| 2,524,035 | Bardeen et al. | Oct. 3, 1950 |
| 2,560,594 | Pearson | July 17, 1951 |
| 2,583,008 | Olsen | Jan. 22, 1952 |
| 2,629,672 | Sparks | Feb. 24, 1953 |